United States Patent
Ontiveros

(10) Patent No.: US 6,957,478 B1
(45) Date of Patent: Oct. 25, 2005

(54) MOTOR VEHICLE UTILITY TOOL

(76) Inventor: Steve Ontiveros, 1190 S. K St., Oxnard, CA (US) 93033

( * ) Notice: Subject to any disclaimer, the term of this patent is extended or adjusted under 35 U.S.C. 154(b) by 0 days.

(21) Appl. No.: 10/982,847

(22) Filed: Nov. 5, 2004

(51) Int. Cl.$^7$ .............................................. B25B 27/14
(52) U.S. Cl. ............................ 29/278; 29/242; 29/243; 29/270; 269/3; 269/6
(58) Field of Search ........................... 29/278, 242, 243, 29/257, 270, 271, 276; 269/3, 6; 81/177.1

(56) References Cited

U.S. PATENT DOCUMENTS

| | | | | |
|---|---|---|---|---|
| 2,577,193 A | * | 12/1951 | Imse | ................................ 59/7 |
| 4,784,610 A | | 11/1988 | Stuart | |
| 5,191,690 A | * | 3/1993 | Koehn | .......................... 29/275 |
| 5,253,406 A | * | 10/1993 | Shere et al. | ................... 29/240 |
| 6,409,152 B1 | * | 6/2002 | Bagley | ......................... 254/18 |
| 6,886,229 B1 | * | 5/2005 | Wilson | ......................... 29/267 |

* cited by examiner

Primary Examiner—Lee D. Wilson
(74) Attorney, Agent, or Firm—Richard S. Erbe

(57) ABSTRACT

A tool for disconnecting the air and electrical connections between a motor vehicle and a trailer or a utility hookup station includes a handle and a forked portion. A spring-mounted push bar extends away from the handle and abuts the electrical connection socket of the trailer. A lifting lug on one of the prongs of the forked portion of the tool lifts the hinged plate away from the trailer's electrical connection. The tool is placed around the electrical connection adjacent the trailer and is pushed upward until it engages the trailer plug. The handle is then pushed towards the trailer, forcing the plug on the motor vehicle away from the socket. Projections extending from the forked portion of the tool can be used to engage the air line connectors between a motor vehicle and a trailer or a utility hookup station to separate the air lines.

10 Claims, 4 Drawing Sheets

MOTOR VEHICLE UTILITY TOOL

RELATED APPLICATIONS

Not applicable.

BACKGROUND OF THE INVENTION

1. Field of the Invention

The present invention relates to tools for use with motor vehicles. More particularly, it relates to a portable tool for use in disconnecting power and air lines between a motor vehicle, such as a truck cab, and a trailer that is towed by the motor vehicle, or some form of utility hookup apparatus.

2. General Background and State of the Art

The economy of our developed industrial nations relies heavily on the transport of goods by trucks and truckers. Many trailers that are towed by a truck, because of the nature of the goods they carry, require both power and air. Truck/trailer combinations actually have two air lines, one for service and one for the parking brake (a safety feature on modern trucks).

During the last several years, travel by recreational vehicle (RV) has become increasingly popular. Nationwide, there are numerous camp grounds that provide space for persons traveling by RV that include hookups for power. That way, when a person or persons wants to camp for the night, they have ready access to necessary power for their comfort. Recently, RV's, especially large ones, have switched to air powered brakes and air assisted electrical and hydraulic brakes on trailers towed by them.

The typical way of hooking up a truck and trailer for power is to plug a female connector on the end of an electrical cable from the truck into a socket having connector pins that is mounted in the wall of a trailer. The connector pins in the trailer are protected by a hinged plate that covers the pins when the trailer is not hooked to the truck's electrical system. The hinged plate is moved up and away from the socket when the electrical system of the trailer is hooked up to the electrical system of the truck.

Electrical wires that connect to the electrical system of the trailer are connected to pins that are mounted on the inside of the trailer wall just behind the socket. The pins are in electrical communication with the connector pins.

Air lines between trucks and trailers are generally joined by locking flanges found mounted on the trailer wall and corresponding locking flanges found on the air lines from the truck. This kind of structure is generally known as "glad hands."

The electrical lines connecting commercial trucks to trailer systems or RV's to campground utility system are usually disengaged from each other by pulling the socket and the plug portions away from each other by hand. This procedure can be difficult on a person's hands and can easily cause injury. Often, after a lengthy trip, the socket and plug portions can be very dirty and can cause a mess. Some of the dirt and grime collected on the electrical connectors could infiltrate the body through an opening in the skin and cause illness or infection.

Another problem associated with manually separating the electrical socket and plug on a motor vehicle system is that the process of pulling the two apart frequently includes "wiggling" of the socket and plug, which may lead to the wires in the trailer being separated from the connector pins. Thus, some of the trailer's lights may not receive electricity or the supply of electricity will be interrupted, causing the trailer lights to blink or become inoperable. This result leads to traffic citations being handed out to truckers as they carry out their work. It may also lead to a potentially dangerous situation on the road under conditions of low visibility.

The inventor knows of only one attempt to devise a way to disconnect the electrical connectors between a commercial truck cab and a trailer that differs from the manual procedure. U.S. Pat. No. 4,784,610 discloses a tool permanently attached to the electrical connection socket of a trailer. To disconnect the truck electrical line from the electrical system of the trailer, a person grasps the tool by its handle and by applying leverage against the plug can pull the handle away from the trailer causing the plug and socket to separate. The tool disclosed in Stuart is permanently attached to the trailer and cannot be stored in the truck cab, nor can the tool be used to separate the air lines between the truck cab and the trailer. Furthermore, it cannot be adapted for use on all models of trailer.

Thus, there exists a need for a tool that can be carried by the driver of a truck or an RV that can be used to separate the power air lines on the truck or RV from the corresponding electrical hookups on a trailer or in an RV campground.

There also is a need for a tool that can be carried by the driver of a truck or an RV that can be used to separate the air lines on the truck cab or RV from the corresponding air hookups on a trailer.

SUMMARY OF THE INVENTION

Accordingly, it is an object of the invention to provide a tool for use with a large motor vehicle that can be used to separate electrical lines between the motor vehicle and another body.

An additional object of the invention to provide a tool for use with a large motor vehicle that can be used to separate air utility lines between the motor vehicle and another body.

A further object of the invention is to provide a tool for use with a large motor vehicle that is easy to use and store.

Yet another object of the invention to provide a tool for use with a large motor vehicle that is portable.

Still another object of the invention to provide a tool for use with a large motor vehicle that can be used with any model of motor vehicle or trailer, regardless of the manufacturer.

It is yet another object of the invention to provide a tool for use with a large motor vehicle that protects the electrical connectors of a commercial truck trailer from damage.

Another object of the invention to provide a tool for use with a large motor vehicle that protects the hands of the user from injury and dirt.

These and other objectives are achieved by the present invention, which, in a broad aspect, provides the user with a hand tool that can be stored in the cabin of a truck cab or other motor vehicle and be carried to the back of the vehicle to disengage the electrical or air systems between the truck cab and a trailer or between an RV and the utility hookups found in campgrounds.

The tool of the present invention includes a handle portion connected to a u-shaped or forked portion at one end of the handle portion. The forked portion includes a pair of linear elements extending away from the point where the handle portion joins the forked portion. Each of the linear elements includes a recess in it to provide a means to prevent the tool from slipping while it is in use.

A spring-loaded push bar is hingedly mounted to the handle and is used to apply pressure against an electrical connector on a trailer wall when using the tool. A lifting lug extends from one of the linear elements to lift the hinged cover away from the electrical socket when the tool is in use. The push bar is constructed so that it can be adjusted in length so that the tool may be adapted for use with any commercially made truck or RV.

When a trucker, for example, wishes to disconnect the electrical connection between a truck cab and a trailer, he or she grasps the handle portion on one end and pushes the forked portion up around the electrical connection adjacent the trailer wall. The push bar abuts the trailer electrical connector to provide leverage for the disconnecting procedure. The lifting lug pushes the hinged cover on the trailer electrical connector up and away from the juncture of the trailer electrical socket and the truck electrical cable socket. Once the tool is in this position, the trucker pushes the handle towards the trailer wall. The linear elements engage the lugs on the side of the truck electrical connector and cause it to move horizontally away from the trailer electrical connection. This operation does not require the electrical lines to be manipulated in a manner that will cause the electrical wires and connecting pins in the trailer electrical system to break loose.

The tool of the present invention may also be used to separate the two air lines that connect a truck cab's air system to a trailer's air system by the incorporation of a pair of projections extending from one of the linear elements of the forked portion of the tool. The linear elements are configured to engage the connecting elements of the air systems, commonly known as "glad hands." The projections engage the air connector on the trailer and are rotated to simulate the motion of a wrench. This operation causes the connecting elements to disengage from each other, thus enabling the user to separate the two air systems.

The tool of the present invention may also be used in conjunction with a recreational vehicle. Recreational vehicles can be hooked up to utilities in many campgrounds, and the tool of the present invention can be used to disengage the utility systems of the recreational vehicle from the utility hookups provided by the campground owners.

The tool of the present invention also includes a gripping portion to aid in its effective operation. While the tool may have a variety of constructions, it will preferably be a cast construction.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiments of the invention with reference to the drawings in which.

DETAILED DESCRIPTION OF THE PREFERRED EMBODIMENT OF THE INVENTION

Figures 1, 2:
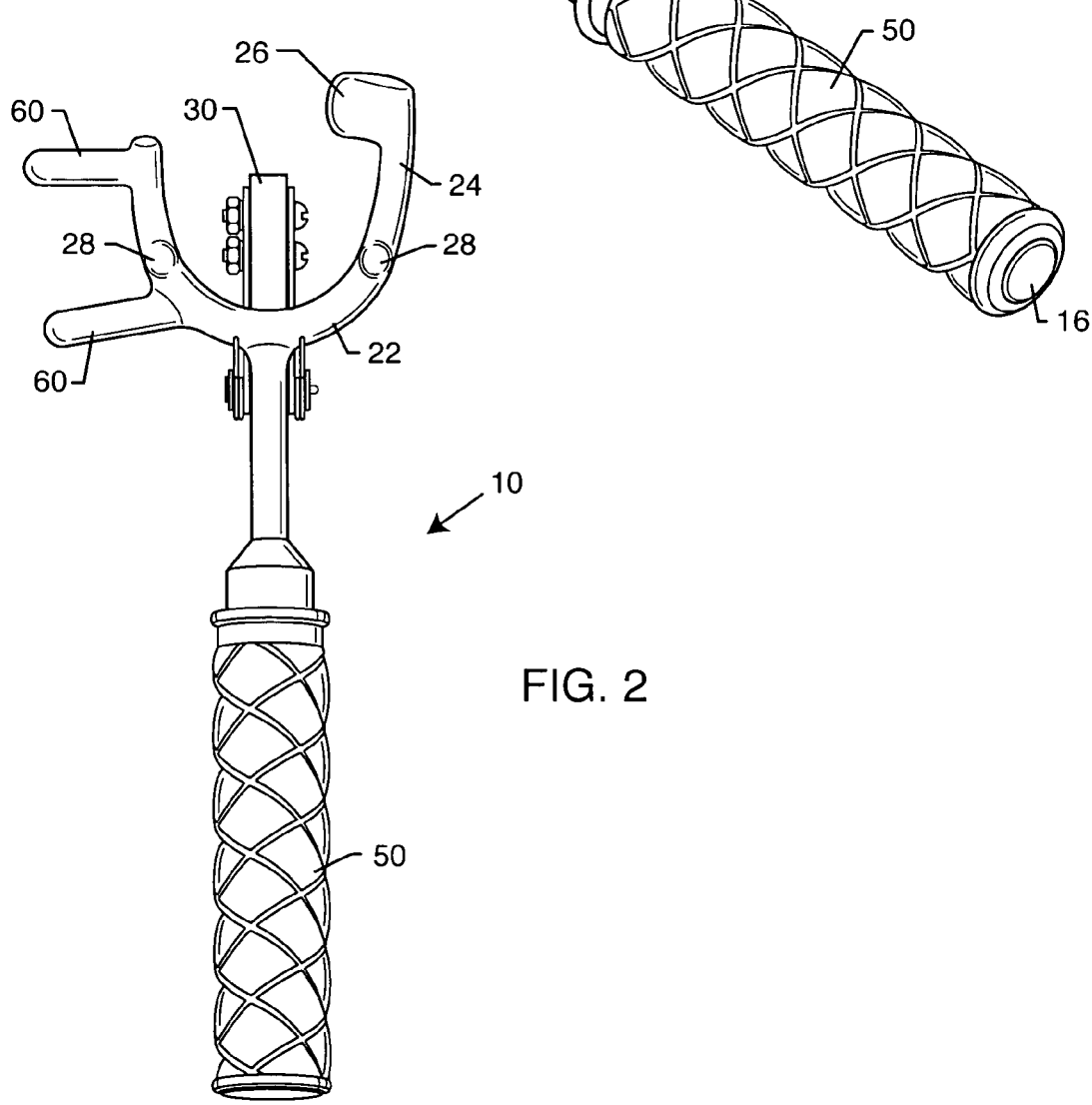
FIG. 1 illustrates a perspective view of an exemplary tool according to the present invention.
FIG. 2 illustrates a front view of an exemplary tool according to the present invention.
Figures 3, 4:
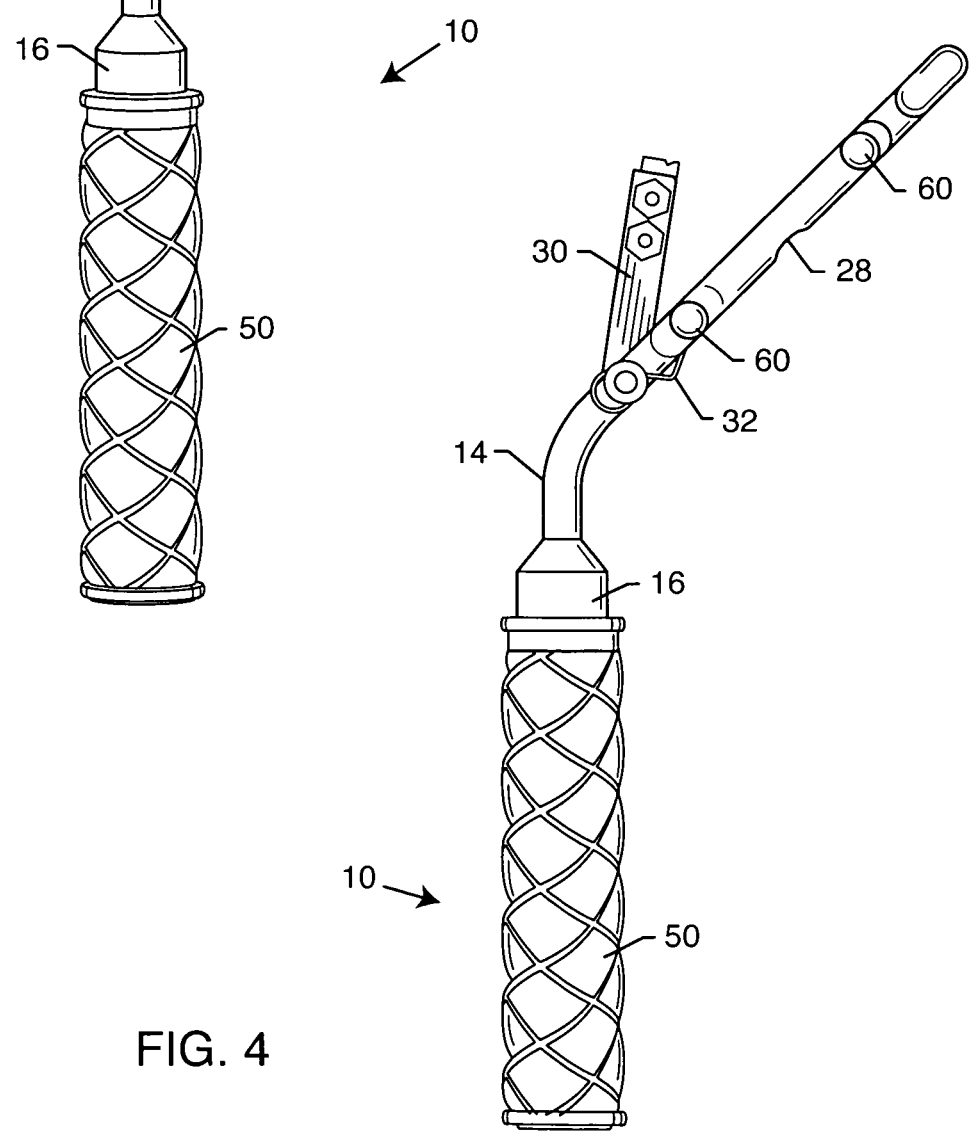
FIG. 3 illustrates a plan view of an exemplary tool according to the present invention.
FIG. 4 illustrates a side view of an exemplary tool according to the present invention.

In the following description of the invention, reference is made to the accompanying drawings, which form a part thereof, and in which are shown, by way of illustration, an exemplary embodiment illustrating the principles of the present invention and how it may be practiced. It is to be understood that other embodiments may be utilized to practice the present invention, and structural and functional changes may be made thereto without departing from the scope of the present invention.

The preferred embodiment of a tool according to the present invention is illustrated in FIGS. 1–4 and is generally referred to by the reference numeral 10. The tool is preferably constructed of metal and is designed to be. Tool 10 includes a handle 12, which includes a straight portion 16 and a curved portion 14. Handle 12 also includes a gripping portion 50.

Attached to handle 12 is a fork 20, which includes curved element 22 and a pair of linear elements 24. At the end of one linear element 24 is a lifting bar 26, whose function will be described later. Each liner element 24 includes a recess 28, which provides a more secure fit between tool 10 and the electrical connection on a motor vehicle when tool 10 is in use.

Curved portion 14 of handle 12 also has attached to it a push bar 30. Push bar 30 is rotatably attached to handle 12 by means of a spring 32. Push bar 30 provides leverage when tool 10 is used to separate the electrical connectors between a truck and a trailer.

Another feature of tool 10 is a pair of projections 60 extending from one of the linear elements 24. In the preferred embodiment of the invention, there are illustrated two projections 60, but it is possible to include a different number of projections without departing from the scope of the invention. The purpose of projections 60 will be discussed later.

Figure 5:
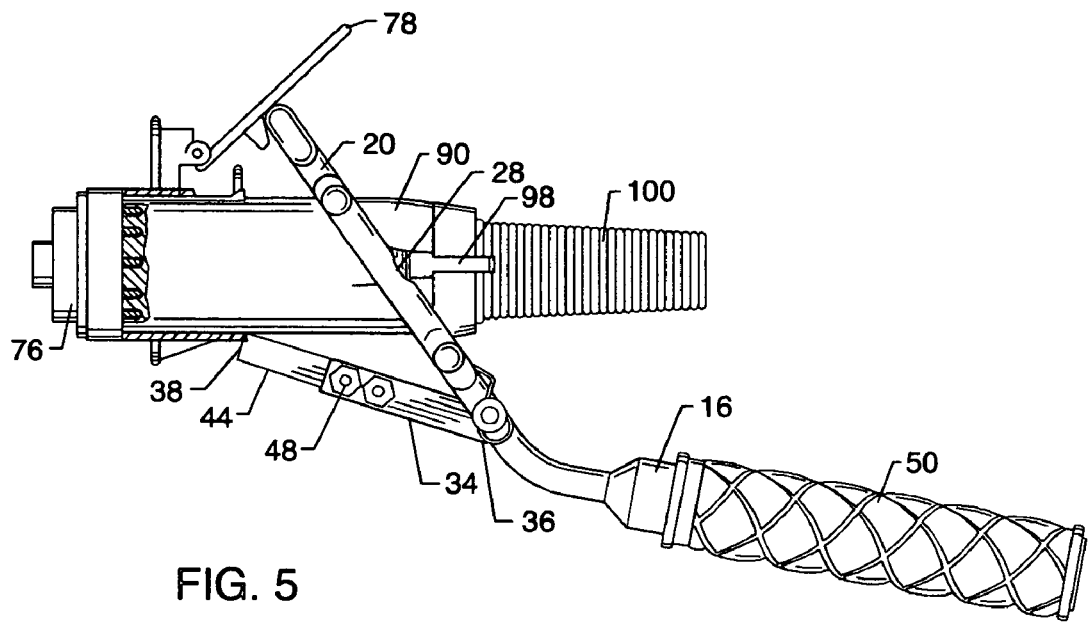
FIG. 5 illustrates a side view of an exemplary tool according to the present invention as it is applied to start separating an electrical connection between a truck cab and a trailer.
Figure 6:
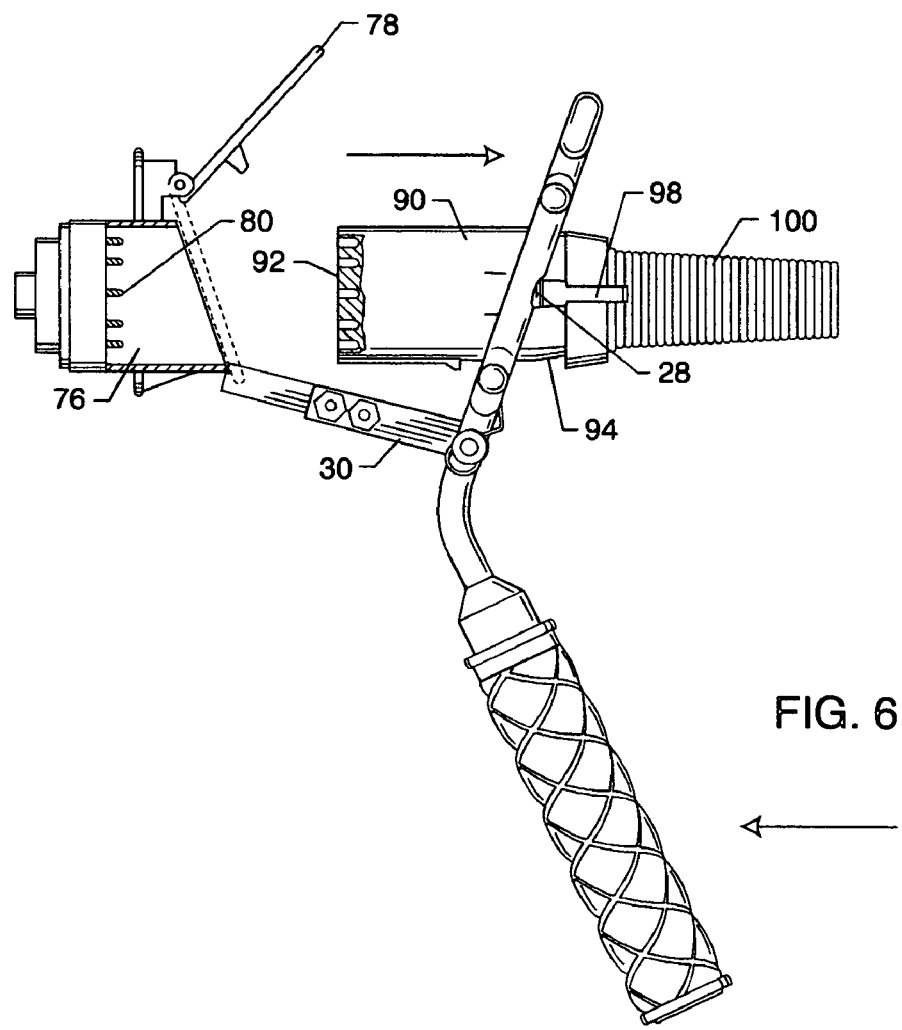
FIG. 6 illustrates a side view of an exemplary tool according to the present invention as it completes the separation of an electrical connection between a truck cab and a trailer.

FIGS. 5 and 6 illustrate how the components of tool 10 can be used to separate the electrical connectors between a truck cab and a trailer. In this example, an electrical socket assembly 76 mounted on the outside wall of a trailer is connected to a plug member 90 at the end of cable 100 extending from a truck cab.

To separate plug member 90 from socket assembly 76, fork 20 of tool 10 is positioned so that it straddles axial body 94 of plug member 90. As tool 10 is moved closer to socket assembly 76, lifting bar 26 lifts hinged cover 78 to enhance the ability of tool 10 to separate the two connectors. At the same time, push bar 30 abuts socket assembly 76 and provides leverage during the separation procedure.

Handle 12 is then pushed towards socket assembly 76, which then causes the linear elements 24 to press against lugs 98 on plug member 90. Recess 28 on each linear element 24 helps to prevent slippage as tool 10 engages lugs 98. As the user continues to push handle 12 towards socket assembly 76, push bar 30 rotates away from handle 12 and continues to apply the needed leverage. Pressure applied by linear elements 24 against lugs 98 moves plug member 90 away from socket assembly 76, thus causing connector pins 80 in socket assembly 76 to separate from female connector 92 of plug member 90.

Push bar 30 is constructed to be adjustable in length, enabling tool 10 to be adapted for use with any manufacturer's vehicle. In the preferred embodiment of the invention, push bar 30 is configured of channel 34 and an extension 44 that slides between side panels 40 of channel 34. Push bar 30 is attached at its proximate end 36 to handle 12, and its distal end 38 is designed to interface with a socket assembly on the wall of a trailer.

Side panels 40 and extension 44 have a series of openings (not shown) through them, through which fasteners 48 are inserted. The openings in side panels 40 are patterned to align with the openings in extension 44. To change the length of push bar 30, the user removes fasteners 48 from the openings in side panels 40 and extension 44 and slides extension 44 within channel 34 as appropriate and aligns the openings in side panels 40 with those in extension 44. Fasteners 48 are then inserted through the openings to fix the length of push bar 30.

Figure 7:
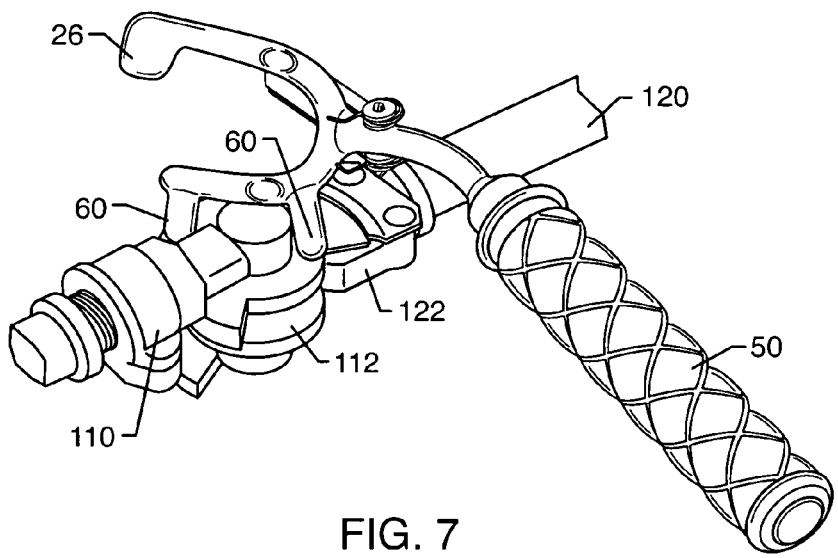
FIG. 7 illustrates a side view of an exemplary tool according to the present invention as it is applied to start separating an air connection between a truck cab and a trailer.
Figure 8:
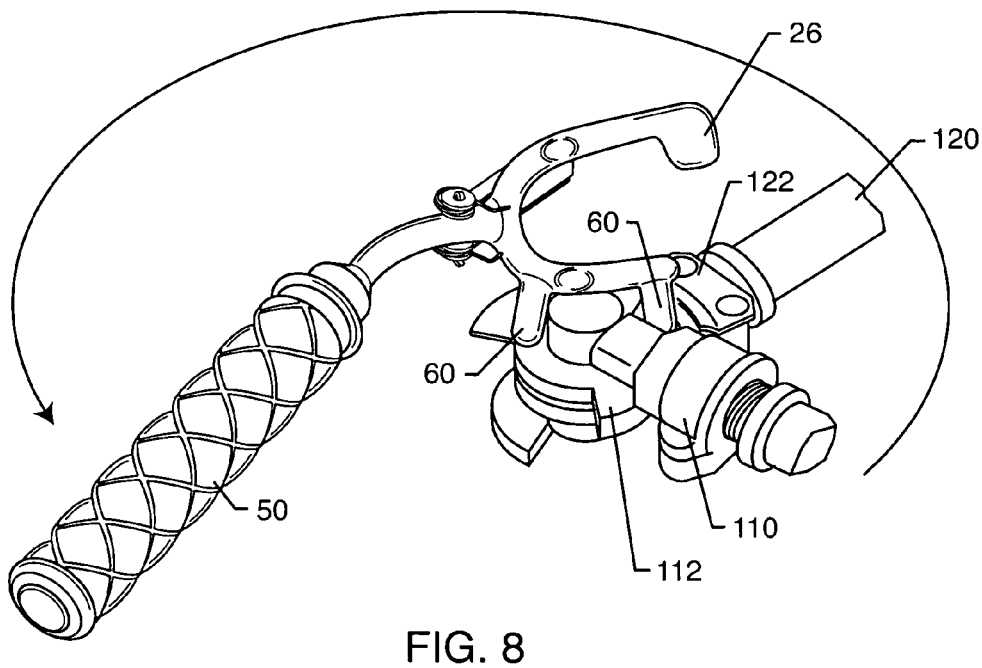
FIG. 8 illustrates a side view of an exemplary tool according to the present invention as it completes the separation of an air connection between a truck cab and a trailer.

FIGS. 7 and 8 illustrate how tool 10 may be used to disconnect the air lines between a truck cab and a trailer. Tool 10 includes a pair of projections 60 for assisting in the disconnect procedure. Projections 60 are tapered to allow tool 10 to be used with a wide variety of trucks and trailers produced by different manufacturers.

Most commercial trucks and trailers use what is known as "glad hands" to connect their air lines. In FIGS. 7 and 8, an air socket 110 from a trailer is connected to an air line 120 from a truck. Projections 60 are placed against flanges 112 and 122 and tool 10 is turned in the manner shown to disengage air socket 110 from air line 120.

The foregoing description of the exemplary embodiment of the present invention have been presented for purposes of enablement, illustration, and description. It is not intended to be exhaustive of or to limit the present invention to the precise form discussed. There are, however, other configurations for motor vehicle utility tools not specifically described herein, but with which the present invention is applicable. The present invention should therefore not be seen as limited to the particular embodiment described herein; rather, it should be understood that the present invention has wide applicability with respect to motor vehicle utility tools. Such other configurations can be achieved by those skilled in the art in view of the description herein. Accordingly, the scope of the invention is defined by the following claims.

What is claimed is:

1. A tool comprising:
   a handle;
   a forked member attached to said handle, said forked member generally in the shape of a "U" having a curved element and a pair of linear elements extending away from said handle;
   a push bar rotatably attached to said handle; and
   a lifting lug attached to one of said linear elements.

2. The tool according to claim 1, further comprising a spring connected between said push bar and said handle.

3. The tool according to claim 1, wherein said push bar further comprises:
   a channel portion having a proximate end and a distal end including a pair of side panels, said channel portion connected to said handle at said proximate end;
   a plurality of openings in said side panels; and
   an extension slidably inserted in said channel portion having openings corresponding to the openings in the side panels; and
   a plurality of fasteners extending through said side panel openings and said extension openings,
   whereby, said push bar may be adjusted in length.

4. The tool according to claim 1, wherein said lifting bar is pivotably mounted to a linear element.

5. The tool according to claim 1, further comprising a gripping element on a length of the handle.

6. The tool according to claim 1, wherein said handle further includes a curved portion and a straight portion.

7. The tool according to claim 1, further comprising a plurality of projections extending from one of said linear elements.

8. The tool according to claim 7, wherein said projections are substantially perpendicular to the axis of the linear element.

9. The tool according to claim 7, wherein said projections are tapered.

10. The tool according to claim 1, further comprising a recess in each of said linear elements.

* * * * *